United States Patent Office 3,526,458
Patented Sept. 1, 1970

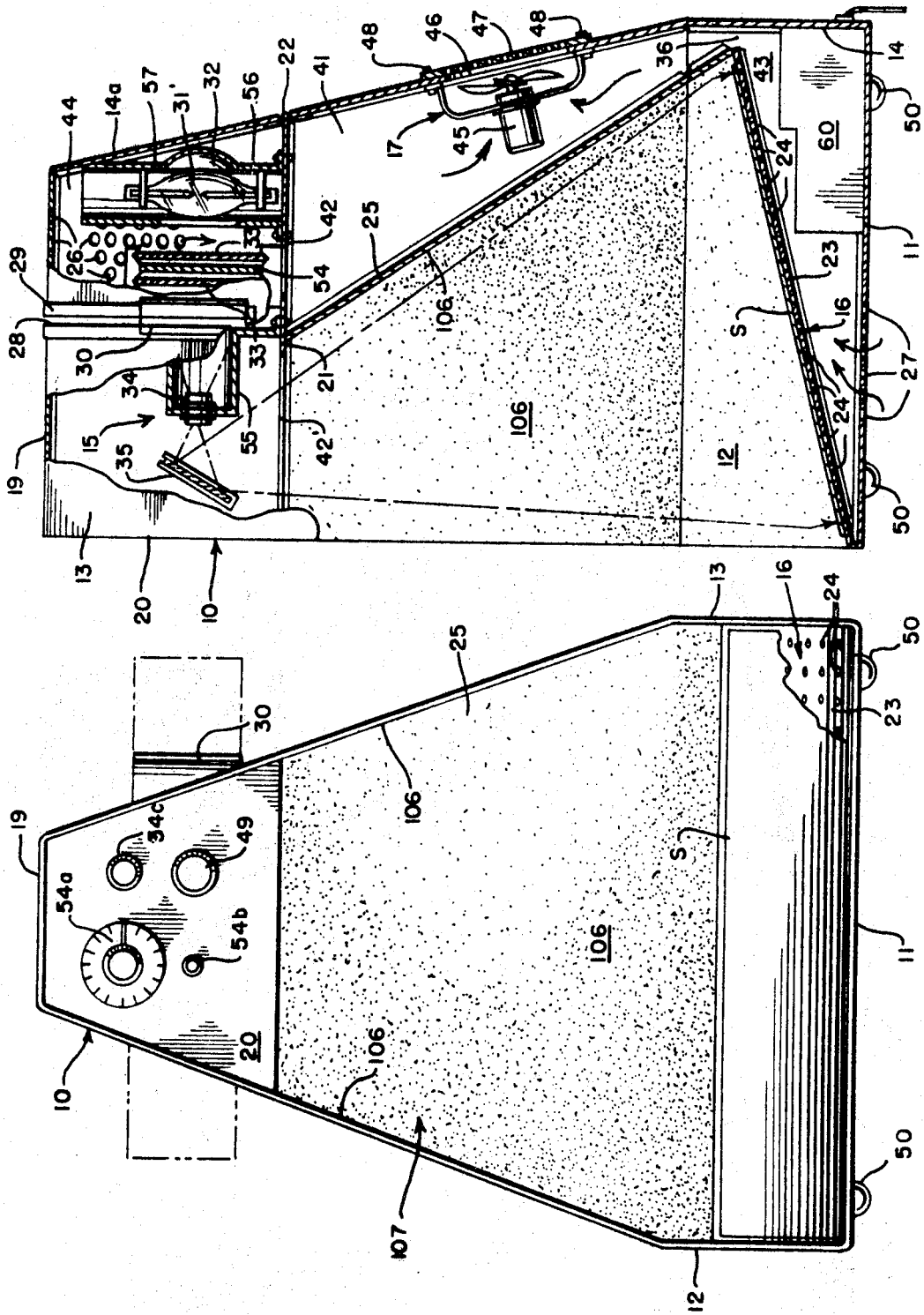

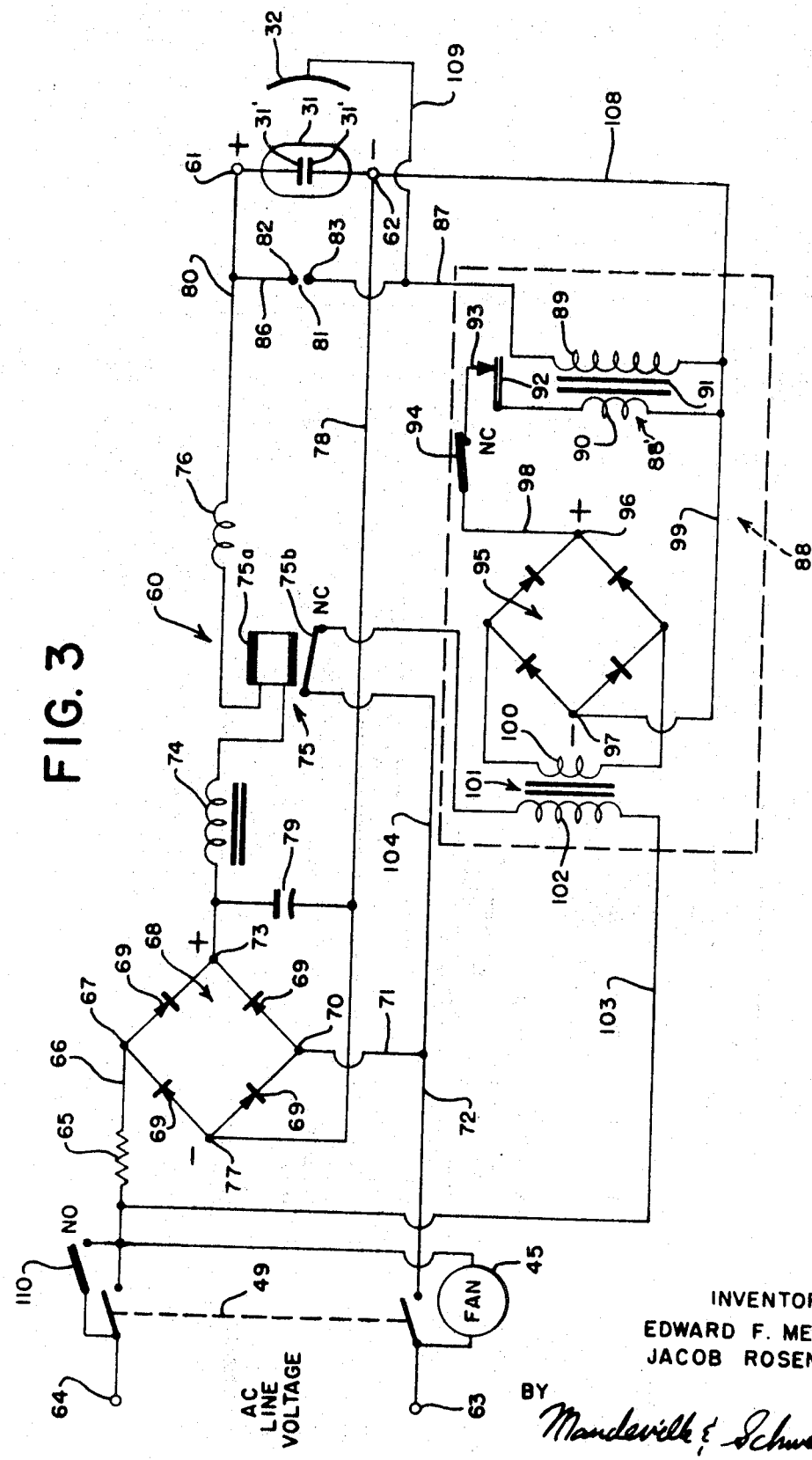

3,526,458
MICROFILM READER-PRINTER
Edward F. Meyers, Roslyn Heights, and Jacob Rosenbaum, Spring Valley, N.Y., assignors to Taffet Electronics, Inc., Woodside, N.Y., a corporation of New York
Filed June 24, 1968, Ser. No. 739,403
Int. Cl. G03b 27/60, 27/70
U.S. Cl. 355—45                                                6 Claims

ABSTRACT OF THE DISCLOSURE

A photographic reader-printer for enlarging microfilm images by projecting them onto a viewing screen. The screen also functions simultaneously as an easel for sensitized recording paper. A high pressure, short arc mercury vapor lamp is used as a light source in the projector section, and this together with an associated high power electric supply requires a heat dissipating means. The latter is accomplished by providing a dual purpose air circulating system in the reader-printer housing consisting of a plenum chamber communicating with all of the high heat sources and with the bottom side of the screen-easel. An exhaust fan located in an outer wall of the housing simultaneously exhausts heated air from the plenum chamber and provides a partial vacuum at the easel while cooling the circuit elements and the lamp.

BACKGROUND OF THE INVENTION

While many sophisticated microfilm viewers have been available to the art for the purpose of "screening" the contents of microfilm, aperture cards or microfiche, few, if any, have been available to reliably and economically produce "blueprints" from the projected images. (Actually, "blueprints" is a misnomer for drawings or other prints having "white" or otherwise light colored lines on a blue or black or otherwise dark colored background, which image is developed by ammonia vapor after having been exposed to ultra-violet sensitive photographic papers.) Accordingly, the present invention is directed to the provision of an efficient, economical, and easy-to-operate apparatus for viewing enlarged microfilm images and exposing the images using ultra-violet radiation on diazo sensitized papers for subsequent development by ammonia vapors.

As is well known to the photographic arts, the speed with which an optical image may be reproduced on sensitized photosensitive paper is a function of the intensity of the image, the light and spectral sensitivity of the recording medium and the strength of the developing medium. The latter two variables are independent of the apparatus employed, however, the former variable, i.e., image intensity, is definitely a function of the efficacy of the apparatus. To that end, the apparatus of the present invention provides projected images of optimally high photo intensity which, in effect, "speeds up" (in the photographic sense) the recording paper employed. For example, a paper which may be developed in one minute by less than optimum techniques using conventional paper and methods may be developed in considerably less time utilizing the same techniques and paper with an optimally intense image.

However, in diazo processes, the provision of sufficient ultra-violet light has required high power mercury vapor lamps which, in turn, have presented problems in economically starting and economically operating the mercury lamps. Moreover, mercury vapor lamps of high power have presented problems in dissipating the heat generated by the lamps as well as the heat generated by the electric operating circuitry. More specifically and as is known to the art, high pressure, short arc mercury vapor lamps typically operate at a predetermined, comparatively low voltage, but require an enormously higher voltage to be supplied to the lamp terminals for starting. Heretofore, a power transformer or ballast was employed to provide the two different voltages required for starting and operating. A high leakage reactance was used to provide the high ambient voltage required to start the mercury vapor tube. Upon firing of the tube, the voltages dropped and were limited by the transformer-ballast design to the lower operating voltages. Needless to say, the power transformers and reactors employed in the conventional circuits are heavy, expensive, and unduly bulky, and often introduce heating problems.

SUMMARY OF INVENTION

The present invention is directed to a new and improved, highly economical reader-printer especially adapted for enlarging microfilm images to the standard C size, approximately 17" x 22", commonly and extensively employed in engineering practice and particularly in the so-called "blueprint field." Specifically, the apparatus of the invention provides a relatively inexpensive, easy-to-operate, and highly compact unit for reading ephemeral microfilm images projected on a viewing screen, which screen simultaneously functions as a vacuum easel for sensitized recording papers.

More specifically, and as mentioned hereinabove, the use of "high pressure short arc" mercury vapor lamps and high power electric supplies therefor introduces problems in dissipating generated heat. In accordance with the invention, these problems are solved in a unique manner by a new and improved housing incorporating a dual purpose air circulating system which provides a partial vacuum for a viewing screen-easel and a cooling flow of air about the mercury vapor lamp and circuit element heat sources. The new and improved reader-printer housing includes a special plenum chamber communicating with all of the high heat sources as well as with the bottom side of the screen-easel. An exhaust fan is disposed in an outer wall of the housing and operates to exhaust heated air from the plenum chamber, thereby providing a partial vacuum at the easel and providing cooling for the circuit elements and the mercury vapor lamp.

In accordance with a further important aspect of the invention, new and improved short arc mercury vapor lamp starting and operating circuitry is provided. Specifically, the "run circuitry" of the lamp power supply includes a resistive ballast and a full wave bridge rectifier to convert the alternating line voltage to a comparatively low D.C. voltage for operating the lamp after starting. Ripple voltages from the rectifier are smoothed by the inclusion of appropriate chokes and a capacitor.

In accordance with the principles of the invention, the very high voltage required to ionize the mercury vapor in the high pressure, short arc lamp and thus initiate the arc between the lamp electrodes is furnished by "start circuitry" including a high voltage source (advantageously an ignition coil including a vibrator which generates high frequency voltages, on the order of 10 to 25 kilovolts) applied across the tube electrodes through a spark gap. Two important purposes are served by the gap. It isolates the high voltage supply from being effectively short circuited by the relatively low voltage lamp supply, and it also establishes the lower limit of the very high starting voltage which reaches the mercury lamp electrodes. Additionally, and in accordance with the invention, the high voltage source is employed to create a field of high potential difference within the high pressure lamp envelope, which field facilitates starting of conduction (i.e., "firing"), when the high voltage is applied to the lamp electrodes. This field is developed by applying high voltage to a metallic reflector immediately adjacent to the lamp envelope.

When the lamp has "fired" or become conductive, the current is conducted through a relay coil which operates to shut off and to remove the "firing" voltage automatically from the lamp electrodes. Additionally, since some mercury vapor tubes do not always reliably start upon the initial application of the firing voltage (due to low temperature, improper vaporization, etc.) the "firing period," i.e., the time during which high voltage is impressed across the tube, is limited to about 30 seconds and then terminated with an "off period" of about the same duration. In accordance with the invention, this is accomplished by including a bimetallic strip in thermal contact with a portion of the equipment which heats during the operation of the high voltage source, such as the vibrator of the ignition coil. The heat generated after approximately thirty seconds of operation causes the bimetallic strip to bend and open a circuit in the high voltage coil rendering it inoperative until the bimetallic strip cools and re-establishes contact to remake the "firing" circuit. Cooling is provided by the above-described new air circulating system.

DESCRIPTION OF DRAWINGS

A more complete understanding of the invention and a better appreciation of its attendant advantages may be had by reference to the following detailed description taken in conjunction with the accompanying drawings, in which:

FIG. 1 is a front elevational view of a microfilm reader-printer embodying the principles of the invention;

FIG. 2 is a side elevational view of the new reader-printer with portions broken away to show cross-sectional details of construction; and FIG. 3 is a schematic diagram of the new and improved circuitry of the invention which is employed to start and to operate the mercury vapor lamp.

DESCRIPTION OF THE PREFERRED EMBODIMENT

Referring first to FIG. 1, the new reader-printer includes an upright housing 10 which encloses and supports an optical system 15, a viewing screen-easel 16, an air circulating system 17, and power supply 60 (FIG. 2).

Specifically, the housing 10 comprises a rectangular base panel 11 and upwardly extending side walls 12, 13, a rear wall 14, and a top panel 19. The front of the housing is substantially open, however, the uppermost portions thereof are closed off by a control panel 20. As shown in FIGS. 1 and 2, the side and rear walls 12–14 are perpendicular to the base panel 11 at their lowermost portions. In accordance with the invention, the major portions of the side walls 12, 13 are convergent upon the top panel 19 which, as shown, is considerably smaller than the base panel 11, and somewhat similarly, the upper portions of the rear wall 14 are sloped forwardly of the housing 10 to the base panel. A plurality of upper ventilation ports 26 are formed in the side and rear walls 12–14 and 19 immediately adjacent the lamp in the optical system, and a series of lower ventilation ports 27 are formed in the base panel 11 to allow cool air to flow over the power supply, as will be understood. An intermediate wall 55 completely closes off the rearmost upper portions of the housing, as shown.

Referring now to FIG. 2, the housing 10 includes a full-width platform panel 21, which is disposed parallel to the base panel 11 and extends forward from the control panel 20 to the rear wall 14. The platform panel 21, the intermediate wall 55, and the housing form a projection lamp chamber 44. Advantageously, the uppermost portion 14a of the rear wall 14 is articulated to the intermediate portions of the rear wall by a hinge 22, thereby forming a trapezoidal door which may be swung open to provide direct access to the individual elements of the optical system 15. The housing 10 further includes a light colored panel 23 having a grid of small circular openings 24 formed throughout, which panel extends upwardly and rearwardly from the front edge of the base panel 11 toward the rear wall 14. The perforated panel 23 forms the viewing screen-easel 16. As shown, it extends across the full width of the housing and terminates short of the rear wall 14. An interior wall panel 25 extends from the rearmost edge of the perforated panel 23 upwardly and forwardly of the housing to the platform panel 21.

The housing 10 further includes a plurality of feet 50 to elevate the base panel 11 from the supporting surface upon which it rests and thus to accommodate the free flow of air into the ports 27. As will be understood, in lieu of feet 50, appropriate legs may be provided or, indeed, a free standing base console or cabinet unit may be provided to support the housing 10. Such a base unit may appropriately include storage space for diazo sensitized recording paper as well as a conventional, self-contained diazo developing apparatus.

As shown best in FIG. 2, a transverse slit-like opening 28 is formed through the projection lamp chamber 44 in the top of the housing 10 and a microfilm guide 29 is mounted therein. Advantageously, the microfilm guide is "universal" and is adapted to accept microfilm holder modules 30 of standard design for aperture cards, microfiche, roll film (indicated in phantom in FIG. 1) and the like. Access to the microfilm holder 30 by a seated operator is easily had by virtue of the convergent side walls 12, 13, in accordance with the invention.

The optical projection system 15 of the new reader-printer includes an ultra-violet lamp 31, e.g., a 500 watt, short arc, high pressure mercury vapor projection lamp (HBO–500), a metallic reflector 32, a plurality of condenser lenses 33, an ultra-violet filter-shutter 54, a projection lens 34, and a canted mirror 35, all of which are readily available standard components. As a specific aspect of the invention, a chimney 56 having enlarged front and rear apertures 57 generally surrounds the lamp 31. The functions of the chimney are to maintain the lamp within a predetermined temperature range, which is sufficiently high enough to prevent the mercury vapor from condensing during operation of the lamp but not too high to cause explosion of the lamp, and to act as a heat shield for the walls of the projection lamp chamber 44. The projection lens 34 is selected to provide enlarged images on the viewing screen-easel which is advantageously approximately 18″ x 24″ to easily accommodate C blueprint size sensitized paper. Needless to say, if desired or necessary, the entire viewer-printer unit may be appropriately proportioned for producing somewhat larger or smaller sized blueprints. As an important specific aspect of the invention, the ultra-violet filter-shutter combination is interposed between two of the condensers. This arrangement cuts off ultra-violet radiation before it reaches the microfilm negatives and thereby helps to prevent fading of the film. It also extends the life of any cemented lens which may be used.

As mentioned hereinabove and as should be understood, the new viewer-printer is especially adapted for reading projected microfilm images and exposing diazo sensitized recording paper to produce latent images thereon, which images may be developed or "printed" by ammonia vapor using any suitable, conventional diazo developing unit.

In accordance with an important aspect of the invention, the housing walls 12, 13, 14 and 25 define a main plenum chamber 41 which communicates with the projection lamp chamber 44 through an enlarged opening 42 in the platform 21 and communicates through a throat 36 with a vacuum chamber 43. The latter chamber is defined by the base panel 11, the rear wall 14 and the perforated panel 23. As shown in FIG. 2, the sloped rear wall of the plenum chamber 41 includes an exhaust fan 45 suitably mounted in an enlarged opening 43 therein, which opening is covered by a perforated plate 47. By virtue of its location in the canted portion of the rear wall, the fan 45 will be in communication with the ambient atmosphere even if the lower portion of the housing is pushed "flush" against a room wall.

Advantageously, the fan 45 and the plate 47 may be attached to the rear wall 14 by common fastening elements 48. As will be appreciated and in accordance with the invention, the projection lamp chamber 44, the plenum chamber 41 and the vacuum chamber 43 comprise a new and improved air circulating system for viewer-printers of the type disclosed herein. As a further specific aspect of the invention, the electric circuitry 60 comprising the power supply is housed in the vacuum chamber 43 remotely of the lamp 31.

Referring again to FIG. 1, the control panel 20 includes a timer dial 54a and a timer start switch 54b, both of which are appropriately interconnected with the shutter 54 to control the operation of the shutter, as will be described in greater detail hereinafter. The panel also includes a focusing knob 34c which is also appropriately linked to the lens to permit manual adjustment of the focusing thereof. Additionally, an on-off power control switch 49 is included on the control panel 20, which switch is suitably connected to the power supply to start and to run the lamp 31 and the fan 45. Advantageously, a normally open thermal switch 110 is included in the fan circuit in the manner shown in FIG. 3. The switch 110 is physically located near the lamp 31 and will close when the lamp is hot. Accordingly, when the power switch 49 is turned off, the fan 45 will continue to operate until the lamp has been cooled and the switch 110 opened as a result thereof.

As an important aspect of the invention, extremely economical and reliable starting and running circuitry 60 for operating the high pressure short arc mercury vapor lamp 31 is provided. Specifically as shown in FIG. 3, the output of the new circuitry 60 (the voltage across the mercury vapor lamp 31) is completely isolated by high impedance circuit elements from the input (power line terminals 63, 64) across which the line voltage, 120 volts A.C., is applied.

More specifically, the new and improved circuitry 60 includes "run circuitry" and "starting circuitry" which are interrelated by a relay 75. The run circuitry includes an inexpensive ballast resistance 65 which may advantageously assume the form of a wide Nichrome ribbon element of approximately 3 ohms. The ballast resistance is connected by conductor 66 between the power line terminal 64 and an input terminal 67 of a standard full wave rectifier bridge 68 comprising four silicon diodes 69. This arrangement of the ballast tends to minimize the development of deleterious high peak surges of voltage in the diodes 69 and enables the use of lower voltage diodes than would be necessary if the ballast were on the output side of the bridge 68. The other input terminal 70 of the bridge 68 is connected to the other line terminal 63 by conductors 71 and 72.

The "positive" output terminal 73 of the bridge 68 is connected to a mercury vapor lamp terminal 61 in series with a filter choke coil 74, a relay coil 75a, and a radio frequency choke coil 76. The output terminal 77 of the bridge 68 is connected by conductor 78 directly to the mercury vapor lamp terminal 62. Additionally, a capacitor 79 is connected in parallel with the output of the bridge 68 as shown. The capacitor 79 with the filter choke 74 and the RF choke 76 forms a filter circuit, which tends to "smooth" or minimize ripple voltages from the full wave rectifier bridge 68. Most advantageously, operation of the high pressure, short arc mercury vapor lamp with the D.C. output of the "run circuitry," after the lamp has been fired by a high A.C. voltage, tends to substantially increase the lamp life in comparison to its expected life when run on A.C. voltages.

As a further important aspect of the invention, the impedance of the choke coils 74, 76 and the relay coil 75, together with the impedance of the conductor 80 leading from the RF choke to the mercury vapor lamp terminal 61, are of sufficiently high impedance to assist in the attenuation of any RF voltage which may tend to feed back into the power supply. To that end, the conductors 78 and 80 are of sufficient length and resistance and are disposed relative to the other circuit elements to contribute positively and substantially to the aforementioned attenuation. Of significance, this combined high impedance, which serves to isolate the output of the circuitry 60 from the power line supply, provides a high RF impedance across a spark gap 81, described in greater detail hereinafter, which gap is instrumental in initiating the firing of the mercury vapor lamp 31.

The "starting circuitry" generally includes a high voltage source 88 (shown within broken lines in the drawing) and the aforementioned spark gap 81, the electrodes 82, 83 of which are placed across the gap between the electrodes 31' of the mercury vapor lamp by conductors 86, 87, 80, 108. The gap 81 is adjusted so that it is "larger" (in terms of voltage required to jump the gap) than the gap between the lamp electrodes 31'. More specifically, the spark gap electrode 82 is connected by a conductor 86 to the "positive" output line of the rectifier 68, while the electrode 83 is connected by a conductor 87 to one side of the output of the high voltage source 88. The other side of the high voltage ignition coil output is connected by a conductor 108 to the terminal 62.

As an important aspect of the invention, the requisite very high oscillating voltage for initiating conduction or "firing" of the mercury vapor lamp 31 is provided by supplying a high enough oscillating voltage to the spark gap 81 to cause that voltage to break down to generate an oscillating voltage of approximately 15 to 20 kilovolts across the spark gap and across the gap between the lamp electrodes 31'. In accordance with a more specific aspect of the invention, ignition or firing of the high pressure lamp is facilitated by developing a high potential difference within the lamp envelope by the proximity of a high voltage. This proximate high voltage is supplied by connecting the metallic reflector 32 to the high voltage source by conductor 109. As shown in FIG. 3 and in accordance with a further specific aspect of the invention, the high voltage source includes an ignition coil 88' having a high voltage output coil 89 and an input coil 90. The turns ratio of the output coil 89 to the input coil 90 is on the order of approximately 2000:1. As shown, the ignition coil 88' includes an iron core 91 as well as vibrating reed 92 associated with a fixed contact 93. As is known, a D.C. voltage applied across the low voltage coil 90 places the reed 92 into oscillation or vibration and a high frequency, high voltage will be developed in the output coil 89.

The "firing time" of the starting circuitry is limited to a short period by an appropriate timing device which advantageously may be a thermally sensitive switch, such as a bimetallic strip 94 placed in thermal contact with the fixed contact 93 of the high voltage ignition coil 88'. The characteristic of the strip is selected such that the heat generated after approximately 30 seconds of energization of the ignition coil 88' causes the strip to distort sufficiently to open the starting circuit thereby rendering it inoperative. After a period of approximately 30 seconds, the strip is sufficiently cooled to become undistorted and to re-energize the starting coil 88'.

The power to the ignition coil is advantageously supplied by the output of a second rectifier bridge 95 similar to the rectifier bridge 68. As shown, the output terminals 96, 97 of the rectifier 95 are connected across the input coil and vibrator of the ignition coil by conductors 98, 99, respectively. The input to the bridge 95 advantageously is approximately 12 volts and is derived from the output coil 100 of a step down transformer 101.

As shown and as a further specific aspect of the invention, the input coil 102 of the transformer 101 is placed across the A.C. power supply by conductors 103 and 104 which are connected in series with the normally closed relay armature 75b of the relay 75, the coil 75a of which is included in the above-described "run circuitry."

Operation of the new and improved reader-printer is simple, economical and efficient. The switch 49 is thrown to place line voltage across the power supply circuitry 60 and the fan 45 to place both into operation, as will be understood. Thereafter, when it is desired to read a microfilm in whatever form it may take, i.e., aperture card, microfiche, roll film or the like, it is placed in the microfilm holder 30 which is inserted in the film guide 29 of the housing 10.

Referring to FIG. 3, with the lamp 31 cold, when line voltage is first applied across the terminals 63, 64, insufficient voltage is presented at terminals 61, 62 to start conduction, i.e., to "fire" the mercury vapor lamp 31. However, through the normally closed armature 75b of the relay 75, line voltage is applied across coil 102 of the transformer 101, and the stepped down output voltage thereof is in turn applied across the bridge 95. The output of the full wave rectifier bridge 95 is then placed across the high voltage ignition coil 88', the output of which develops a high frequency, high voltage spark across the gap 81 and supplies high voltage in the proximity of the lamp envelope at the reflector 32. The spark is limited to a duration of not more than approximately 30 seconds by the thermal limit switch 94 and in that period the high frequency, high voltage will be impressed across the electrodes of the mercury vapor lamp to initiate electron emission and hence lamp conduction. In the event that conduction does not start after approximately 30 seconds, the thermal switch 94 will cause the ignition coil to recycle continuously until the lamp 31 reliably fires. Upon the commencement of conduction in the lamp 31, the relay coil 75a is energized attracting its armature 75b and thereby disconnecting the "starting circuitry" from the line voltage.

As will be understood, immediately after firing, the mercury vapor lamp has very low impedance and tends to draw as much as 20 amps. However, in accordance with the invention, the ballast resistance 65 safely limits excess power surges to tolerable levels immediately after the lamp has been fired and tends to reduce the voltage supplied to the mercury vapor lamp. Thus, the ballast resistance 65 tends to prevent the burning out of leads, electrodes, and/or other circuit elements. Once the lamp is steadily conducting, the apparatus is ready for use and the light from the lamp 31 will consecutively pass through the condenser lenses 33 and the interposed shutter or filter 54, the microfilm negative, the projection lens 34 where it will tend to be enlarged and projected against the mirror 35 from which it will be reflected downwardly through an opening 42' in the platform 21 and upon the inclined viewing screen-easel 16.

As will be appreciated, the viewing screen-easel is well shaded from ambient light by the convergent side walls 12, 13 of the housing 10 and the inclined wall 25, which walls are flocked with suitable black material 106. These walls cooperate to form a comparatively darkened viewing chamber 107. The sharpness of the image projected on the viewing screen may be adjusted by focusing the projection lens 34 through the control 34c. In accordance with an important aspect of the invention, the heat generated by the mercury vapor lamp 31 and by the power supply 60 is prevented from reaching excessive levels by circulating cooling air thereover and exhausting the circulating air from the housing by the fan 45. As indicated by arrows in FIG. 2, cooling air enters the housing through openings 26, 27, 28 and is forced out of the housing through the opening 46 in the rear wall by the exhaust fan 45. As will be understood and in accordance with the invention, the air drawn through these openings will tend to cool the microfilm negatives in the holder 30, the chimney enclosed lamp 31, and the power supply 60 while providing at least a partial vacuum at the perforated panel 23.

When it is desired to make a diazo print, the yellow ultra-violet filter or shutter 54 may be removed under the control of the timer 54a from the light path to permit the ultra-violet portions of the projected image to reach the easel. The time of exposure required to make a latent image on a diazo sensitized paper is set on the control dial 54a, which is connected to the shutter. A sensitized diazo recording sheet S may be placed on the viewing screen-easel 16, against which it will be firmly held, in accordance with the principles of the invention, by the partial vacuum generated by the removal of air from the housing by the exhaust fan 45. At this stage, the sensitized sheet S may be exposed to the enlarged ultra-violet image by pushing the button 34b to start the timer and to remove the yellow filter-shutter 54 from in front of the lense for the pre-set period. For the sake of brevity, details of the construction of the filter-shutter, timer, and the focusing arrangements have not been illustrated herein, since they are very well known to the art. It is to be understood that many readily available timers, lenses, and shutters may be employed in the practice of the present invention.

The exposed diazo sensitive sheet then may be developed, in accordance with well known diazo reproduction principles, by subjecting it to an atmosphere of ammonia vapor to produce a "blueprint." Any commonly available diazo developing apparatus may be used for this purpose.

As will be appreciated, the viewer-printer of the invention may be easily manufactured from readily available electronic and photographic components. The elements of the new and improved housing may be formed from low gauge sheet metal using conventional sheet metal fabricating techniques. Accordingly, the walls, panels, and platforms forming the multiple chambered housing may be suitably interconnected by spot welds, rivets, screws, and like fasteners or any combination of these.

The arrangement of the elements of the new air circulating system including the projection chamber, main plenum chamber, vacuum chamber, air inlets, and exhaust fan provides highly efficient cooling of the remotely located heat sources, the mercury vapor lamp and the power supply therefor, as well as a partial vacuum of sufficient strength to hold sensitized recording paper firmly against the viewing screen-easel.

The new and improved power supply of the invention including independently operating "run circuitry" and "start circuitry" provides efficient, highly economical, and long lived operation of mercury vapor lamps.

It should be understood that the "viewer-printer" apparatus herein illustrated and described is intended to be representative only, as certain changes may be made therein without departing from the spirit and scope of the invention. For example, with very little, if any, modification, the apparatus may be used with materials such as photographic papers and films sensitized to portions of the radiation spectrum other than the ultra-violet portion and "printable" by other than ammonia developing techniques. Moreover, it will be appreciated that by locating a shutter in front of the lens 34 (rather than behind the lens as illustrated hereinabove) and placing a sensitized film in the holder 30, the new apparatus may be operated as a recording camera. Accordingly, reference should be made to the following appended claims in determining the full scope of the invention.

We claim:
1. A viewer-printer comprising
 (a) an upright housing including a flat base panel, and top, rear and side walls interconnected to define a structure open at its front;
 (b) a platform panel parallel with said base panel extending across the upper portions of said housing between said side walls;

(c) an intermediate panel closing off the uppermost rear portions of said housing and cooperating with the top wall, rear wall, and side walls to define a projection lamp chamber;

(d) an inclined perforated panel of full housing width extending from lower front edge portions of said housing upwardly and rearwardly thereof and terminating short of said rear wall;

(e) an interior wall panel connected to and extending from rear edge portions of said perforated panel upwardly and forwardly of said housing to said platform panel;

(f) said interior wall cooperating with said side walls and said platform panel to define a plenum chamber having a narrow open throat at its lowermost portions;

(g) said perforated panel cooperating with said base panel and said side walls to define a vacuum chamber;

(h) said perforated panel, said platform panel, said interior panel, and said side walls cooperating to define a viewing chamber;

(i) said platform panel being definitive of first and second opening means communicating, respectively, between said projection chamber and said viewing chamber and between said projection chamber and said plenum chamber;

(j) said plenum chamber communicating with said vacuum chamber through said throat;

(k) air inlet means included in at least one wall of said projection chamber and in at least one wall of said vacuum chamber;

(l) air exhaust means included in a wall of said plenum chamber;

(m) an optical projection system including a lamp source disposed in said projection lamp chamber;

(n) power circuit means disposed in said vacuum chamber;

(o) an exhaust fan associated with said exhaust means and adapted to remove predetermined quantities of air from the interior of said plenum chamber;

(p) whereby the removal of said air from said plenum chamber develops a cooling flow of air in and about said projection system and said circuit means while generating at least a partial vacuum at the underside of said perforated panel capable of holding a recording sheet means firmly and stationarily thereagainst.

2. The viewer-printer of claim 1, in which
(a) a microfilm holder means is included in said optical system;
(b) said housing includes guide means therein accommodating the insertion and removal of said holder means; and
(c) an ultra-violet filter-shutter is disposed between said lamp and said holder means.

3. The viewer-printer of claim 2, in which
(a) said optical system includes a high pressure, short arc mercury vapor lamp as a light source;
(b) said optical system further includes a projection lens and a timer associated with the filter-shutter;
(c) said housing includes a control panel;
(d) control means for operating said shutter are included in said control panel.

4. The viewer-printer of claim 1, further characterized in that
(a) access door means are included in said projection lamp chamber.

5. The viewer-printer of claim 1, in which
(a) a plurality of foot means project downwardly from said base panel to elevate said housing with respect to a supporting surface.

6. The viewer-printer of claim 1, in which
(a) said top wall is of smaller size than said base panel;
(b) said side walls are generally convergent toward said top wall;
(c) said rear wall includes inwardly inclined portions mounting said exhaust fan therein.

References Cited
UNITED STATES PATENTS

| | | | |
|---|---|---|---|
| 2,940,358 | 6/1960 | Rosenthal | 355—66 |
| 3,463,585 | 8/1969 | Levine | 355—66 |

NORTON ANSHER, Primary Examiner

R. A. WINTERCORN, Assistant Examiner

U.S. Cl. X.R.

355—66, 73